United States Patent [19]

Macierewicz

[11] Patent Number: 4,650,584
[45] Date of Patent: Mar. 17, 1987

[54] SEAL ARRANGEMENT FOR PROCESSING APPARATUS

[75] Inventor: Jacek J. Macierewicz, Calgary, Canada

[73] Assignee: ELP Products Ltd., Alberta, Canada

[21] Appl. No.: 542,678

[22] Filed: Oct. 17, 1983

[30] Foreign Application Priority Data

Nov. 15, 1982 [CA] Canada .................................. 415595

[51] Int. Cl.$^4$ ............................................... B04C 5/28
[52] U.S. Cl. .................................. 210/512.2; 55/345; 55/502; 277/206 R; 209/144; 209/211
[58] Field of Search ............ 210/787, 788, 304, 512.1, 210/512.2, 450; 55/355, 502, 345, 347; 209/144, 199, 211; 277/13, 14 R, 205, 206 R, 23, 135

[56] References Cited

U.S. PATENT DOCUMENTS

| | | | |
|---|---|---|---|
| 1,618,412 | 2/1927 | Dorward | 92/168 |
| 2,485,537 | 10/1949 | Rae, Jr. | 277/13 |
| 2,714,045 | 7/1955 | Simenson | 277/13 |
| 2,832,223 | 4/1958 | Couraud | 74/18.2 |
| 2,974,501 | 3/1961 | Kaufman et al. | 464/154 |
| 3,104,883 | 9/1963 | English et al. | 277/205 |
| 3,104,884 | 9/1963 | Kerlin | 277/206 |
| 3,236,530 | 2/1966 | Zagórski | 277/135 |
| 3,261,467 | 7/1966 | Wikdahl | 210/512.2 |
| 3,390,890 | 7/1968 | Kurtz | 277/205 |
| 3,440,806 | 4/1969 | Damratowski | 209/144 |
| 3,543,931 | 12/1970 | Rastaller | 209/211 |
| 4,146,469 | 3/1979 | Kaiser et al. | 209/211 |
| 4,148,723 | 4/1979 | Mozley | 210/512.2 |
| 4,162,906 | 7/1979 | Sullivan et al. | 210/512.1 |
| 4,298,206 | 11/1981 | Kojima | 277/205 |
| 4,344,631 | 8/1982 | Winn | 277/135 |
| 4,426,283 | 1/1984 | Fecske | 210/512.2 |
| 4,437,984 | 3/1984 | King et al. | 209/211 |

FOREIGN PATENT DOCUMENTS

| | | |
|---|---|---|
| 559390 | 1/1958 | Belgium . |
| 798708 | 11/1968 | Canada . |
| 877161 | 8/1971 | Canada . |
| 910202 | 9/1972 | Canada . |
| 990685 | 4/1976 | Canada . |
| 1088030 | 6/1980 | Canada . |
| 1081622 | 7/1980 | Canada . |
| EP3594 | 8/1979 | European Pat. Off. . |
| 2554037 | 6/1977 | Fed. Rep. of Germany . |
| 1355198 | 2/1964 | France . |
| 2456558 | 12/1980 | France . |
| 2468043 | 4/1981 | France . |
| 999938 | 7/1965 | United Kingdom . |
| 2034204 | 6/1980 | United Kingdom . |
| 2067683 | 7/1981 | United Kingdom . |

Primary Examiner—Richard V. Fisher
Assistant Examiner—Wanda L. Millard
Attorney, Agent, or Firm—Stevens, Davis, Miller & Mosher

[57] ABSTRACT

A novel seal arrangement is provided for use in processing apparatus of the type including a partition for separating zones of relatively high and low pressures. At least one aperture is provided in such partition, the aperture having a wall. A processing unit (such as a hydrocyclone) has a portion thereof located in such aperture so that an annular region is defined between such unit and the aperture wall. An annular seal of resiliently deformable material is located in this annular region and provides a seal between the above noted zones. This seal is of cup-shaped form and includes an annular outer seal lip which is radially spaced form the processing unit. This seal outer lip is connected to the remainder of the seal via an end wall. The seal outer lip has inner and outer surfaces and a free annular edge remote from the end wall. This inner surface is exposed, in use, to the zone of higher pressure such that the outer surface of the seal lip sealingly engages the wall of the aperture under the influence of the differential pressures acting on it. The seal is located relative to the wall of the aperture and the wall of the aperture is of such dimension that the sealing engagement between the wall and the outer surface of the seal lip occurs in an annular sealing region located generally between and spaced from both the seal end wall and the free annular edge of the seal lip.

19 Claims, 5 Drawing Figures

SEAL ARRANGEMENT FOR PROCESSING APPARATUS

BACKGROUND OF THE INVENTION

This invention relates to improved sealing arrangements for use in various types of processing apparatus with such sealing arrangements being particularly, but not exclusively, suited for use in cannister multicyclone arrangements.

In recent years the so-called cannister arrangement for hydrocyclones has been widely adopted by the pulp and paper industry, particularly in the case of small hydrocyclones having an effective diameter of up to about 125 mm. These arrangements, which are commonly used in the cleaning of pulp slurry, i.e. the removal of both heavy and light impurities therefrom, allows for a very neat and compact layout of the entire cleaning system thus reducing the number of pipes and piping connections and, in general, allowing for very good housekeeping. These pulp stock cleaning systems usually consist of from 2 to about 5 stages and these cannisters which may constitute part but usually the entire stage of the system may serve to contain anywhere from 3 to about 400 hydrocyclones. There are at the present time approximately 10 commercial manufacturers of cannister multicyclone equipment including such important manufactureres as Noss, Celleco, Albia, and Black Clawson.

Two basic designs of cannister multicyclone apparatus are known in the art.

In the first group may be classified cannisters in which the partitions separating the accept, feed and reject chambers are concentrically arranged and cylindrical in shape thus being subjected substantially to hoop stresses only. The partitions are hence made of relatively thin steel of a thickness from about 1.5 to 3.5 mm. In practice the individual hydrocyclones are inserted radially from the outside of the cannister through apertures made in the partitions. The outermost cylindrical shell or envelope may be, during installation, located in a raised position with such outermost shell being thereafter lowered downwardly so as to enclose the entire system; alternatively, this outermost shell may be stationary with openings for inserting and removing each cleaner, each cleaner, during operation, being sealingly covered by a special cap. In both cases, the 2 or 3 concentrically arranged partitions (depending on whether an elutriating system is provided) are provided with aligned sets of perforations or apertures which serve to nest the individual hydrocyclones. Groups of such hydrocyclones, disposed in radially arranged arrays are spaced apart from each other along the vertical axis of the cannister.

The apertures which serve to nest the hydrocyclones must be made in the form of so-called "pulled out" or "pushed in" holes or apertures. This technology involves precisely marking the centers of such apertures and then cutting out small holes and then inserting into these holes a metal pusher or puller and then pressing the same radially to form a cylindrical collar. Thereafter the uneven and cracked edges at the ends of the collars are trimmed. Later on, during assembly of the cannister system, the "pulled out" or "pushed in" holes in the second, third and sometimes fourth partitions, depending upon the cannister design, must be properly aligned to permit subsequent installation of the hydrocyclones. This can be a very formidable task considering that sufficient of these holes must be provided to accommodate, in certain designs, up to approximately 400 hydrocyclones. It has to be kept in mind that the alignment and concentricity of all of the collars as thus formed is very critical. The hydrocyclone body is usually made of a somewhat elastic material. It cannot be soft as buckling or collapse of the hydrocyclone inwardly under feed pressures that are higher than the pressure inside the hydrocyclone must be avoided. Still another problem with the prior art systems is to make the "pulled out" or "pushed in" collars in relatively high tolerances thereby to accommodate the various types of seals used between the hydrocyclones and the partition walls.

Three basic types of seals are in common use. The first type consists of a plurality of elastic annular ribs disposed in series along the axis of the cleaner. The cleaner is made of a resilient material such as polyurethane, hard rubber or vinyl and the sealing ribs are integrally molded with the body of the hydrocyclone. Two or three sets of such ribs, depending upon the number of partitions, are spaced apart along the hydrocyclone with the diameters of same increasing from the small end of the hydrocyclone to the large end. At the time of installation these ribs must fit inside the collars formed in the partitions with locational transition fit thereby to provide for relative ease of installation while at the same time providing for adequate sealing engagement while later on accommodating for some expansion of the hydrocyclone due to moisture pickup by the elastomer from which the hydrocyclone is made.

The second type of seal is known as a "labyrinth" type of seal and this type is used when the hydrocyclone is made of a relatively hard compound such as fiber reinforced nylon. In this case the labyrinth seal is made of soft rubber in the shape of a plurality of spaced apart annular ribs. Each labyrinth seal in the form of an annular body is maintained in position on the hydrocyclone by means of a molded tongue which fits in a groove in the outer surface of the cleaner. Radially outward extremities of the annular ribs of the labyrinth seal contact the inner generally cylindrical surface provided by the collar which was previously formed in the associated aperture and, while the labyrinth seal does not serve to prevent all leakage at start up, it has been found that after the grooves fill up with fiber, the seal fulfills its role.

The third main type of sealing arrangement, instead of using a series of annular ribs, uses "O" ring seals cooperating with the collar formed in the partition. Each "O" ring is located in an associated groove formed in the hydrocyclone body and it is of relatively large cross-section.

Reference was made above to the first group of cannister arrangements incorporating relatively thin cylindrical partition walls. The second basic group of cannister designs is structured with flat partitions having aligned sets of apertures therein so that the hydrocyclones can be inserted into them and positioned parallel to each other. Since the partitions are flat they must be of significant thickness to withstand the pressure forces thereon and they are often reinforced by means of spaced rods linking the partitions together. Because of the thickness of the partitions, the "pulled out" or "pushed in" configuration defining the collars cannot be used as in the case of the thin walled partitions. The apertures for these relatively thick partitions must be punched out or machined by drilling or boring. If the standard types of seals described above are to be used, these apertures must be machined with a high degree of accuracy in order to permit the seal to function adequately. This machining and finishing operation gives rise to very substantial costs.

Two basic seal types are commonly used with the above relatively thick partitions. When the wall thickness is of the order of 8 to 13 mm., the seals may be of a design similar to the first two types of seals described above in connection with the "pulled out" collars. In other words the seals employ a plurality of annular labyrinth style ribs but in the case of the relatively thick partitions, the seal ribs must be made considerably smaller so as to have at least two of these ribs in engagement with the cylindrical surface or wall defined by the hole. (It should be noted here that the "pulled out" collar formed in the thin walled partition has an axial length which is very much greater than the axial length of the hole in the wall formed in the relatively thick walled partition.)

The second type of seal for use with the thick walled partitions utilizes a special elastomeric gasket which fits around the perimeter of the aperture. The gasket has a groove on the outside corresponding in width with the thickness of the plate. The gasket also has at least one and usually two radially inwardly directed lips, which lips engage the surface of the hydrocyclone cleaner thereby to provide the necessary sealing effect. Since in the usual cannister arrangement there are two or three partitions with apertures therein of decreasing diameter it is very difficult to position these seals in the apertures before the hydrocyclone cleaner is inserted. There is a danger that the gasket may disintegrate or be lost inside the cannister and retrieval of same may be impossible.

It will be readily appreciated from the above that both these groups of cannister designs give rise to difficulties insofar as sealing arrangements are concerned. In the case of the first group of cannister designs employing relatively thin partition walls and "pulled out" or "pushed in" collars, a substantial degree of expense in involved in the trimming and finishing of the collars and providing same with the relatively high tolerances involved as well as providing for accurate alignment of same during assembly of the cannister. Likewise in the case of the second group of cannister designs employing flat walled relatively thick partitions, substantial costs again are involved in forming the apertures by way of machining operations and finishing same to the relatively high degree of accuracy required. Certain of the seal designs described above also tend to be relatively costly and certain of them give rise to the problems as noted previously.

SUMMARY OF THE INVENTION

One object of the invention is to provide an improved sealing arrangement for use in a processing apparatus which alleviates the difficulties referred to above.

It is a further object of the present invention to provide a sealing arrangement capable of cooperating with apertures formed in both thick and thin partition walls of the cannisters.

It is a further object to provide an improved seal arrangement capable of cooperating with flat or cylindrical partitions.

A still further object of the invention is to provide a seal arrangement capable of cooperating with almost any finish provided on the wall of the aperture provided in the partition, such as a surface provided by punching without any additional finishing operations.

A still further object of the invention is to provide a seal arrangement for use in the cannister type hydrocyclone arrangements, which seal will perform in a satisfactory manner even if the apertures in the partition walls are not perfectly round and are made with relatively crude tolerances and are poorly aligned after the partition walls have been assembled together.

It is a further object of the invention to provide an improved sealing arrangement wherein a resilient lip of the seal will adjust to inaccurate aperture shapes to provide for good sealing engagement therebetween under the differential pressures encountered during the operation.

It is a further object of the invention to provide a sealing arrangement which permits manufacturing costs of the cannister to be substantially decreased, which arrangements substantially alleviate operational problems encountered with prior art sealing arrangements such as swelling of the ribs behind the collar and difficulties with retracting of the cleaner, deformation of sealing ribs, loss of sealing gasket inside the cannister and the like.

An object of a further aspect to the invention is to provide a cannister arrangement in which all of the hydrocyclones have their accept, feed and reject openings all disposed in respective horizontal planes thereby to provide the hydrocyclones with substantially identical operating pressures, each hydrocyclone being easily accessible from a relatively low horizontal level and all of the reject openings of same being capable of easy inspection simply by raising the lid of the novel cannister arrangement.

Accordingly, the invention in one aspect provides an improvement in processing apparatus of the type including a partition for separating zones of relatively high and low pressures. At least one aperture is provided in such partition, the aperture being defined by an annular wall having a transverse dimension equal to the thickness dimension of the partition. A processing unit (such as a hydrocyclone) has a portion thereof located in such aperture so that an annular region is defined between such unit and the aperture wall. An annular seal of resiliently deformable material is located in this annular region and provides a seal between the above noted zones. This seal is of cup-shaped form and includes an annular outer seal lip which is radially spaced from the processing unit. This seal outer lip is connected to the remainder of the seal via an end wall. The seal outer lip has inner and outer surfaces and a free annular edge remote from the end wall. This inner surface is exposed, in use, to the zone of higher pressure such that the outer surface of the seal lip sealingly engages the wall of the aperture under the influence of the differential pressures acting on it. The seal is located relative to the wall of the aperture and the wall of the aperture is of such dimension that the sealing engagement between the wall and the outer surface of the seal lip occurs in an annular sealing region located generally between and spaced from both the seal end wall and the free annular edge of the seal lip.

Since, in practice, the partition walls are not provided with any "pulled out" collars or the like, the aperture wall referred to above has a dimension measured transverse to the partition which is equal to the thickness dimension of the partition.

The thickness dimension of the partition in the preferred form of the invention is sufficiently small in relation to the seal dimension that the outer seal lip is exposed to at least three pressure zones. In the first zone which is adjacent the free annular edge, the outer seal lip is exposed on both its inner surface and part of its outer surface to the relatively high pressure zone. In the second zone the outer sealing lip is engaged on its outer surface by the aperture wall and thus restrained against expansion under the influence of the pressure acting on its inner surface. There is also a third pressure zone wherein part of the outer surface of the outer seal lip together with the adjacent end wall are exposed to the zone of low pressure so that the corresponding part of the seal lip is subjected to hoop stresses and axial loads under the influence of the differential pressures acting thereon. The second zone noted above is disposed between the first and third zones.

In the typical application, the above noted wall of the aperture is in a relatively raw or unfinished condition. This allows for substantial reductions in manufacturing costs.

In the preferred form of the invention the processing apparatus is a cannister type multihydrocyclone arrangement employing a plurality of said partitions spaced apart and having sets of generally aligned apertures in them. Each set of apertures has an associated hydrocyclone disposed therein with respective seals as described above located and sealingly engaged between the walls of the apertures and associated portions of the hydrocyclones. The hydrocyclones which, per se, may be of relatively standard design, include the usual feed inlet, reject outlet and accept outlet, each in fluid communication with a respective one of the zones defined by the partition walls.

Preferably the above noted annular seals are provided with sloping or frustroconical surface portions arranged to facilitate insertion of the seals along with associated hydrocyclone units into the respective apertures.

In some arrangements the seal may be formed integrally with the processing unit or hydrocyclone. However, in a preferred embodiment to be further described, the seal includes an annular inner seal lip radially spaced from the outer seal lip and integrally connected thereto via the above noted end wall. The inner seal lip has suitable means such as a rib for engaging with a cooperating groove formed on the processing unit thereby to secure same in place.

As noted above, the novel sealing arrangement is capable of cooperating with relatively thin cylindrical walls as well as with somewhat thicker flat partition walls, in both cases, the apertures formed therein being in relatively unfinished, condition thereby to reduce manufacturing costs.

As a still further feature of the invention, there is provided a hydrocyclone cannister arrangement employing a plurality of spaced apart flat horizontally arranged partitions. The hydrocyclones are disposed in the apertures provided in the partitions described above with the accept, feed and reject openings all located in respective horizontal planes thus providing the hydrocyclones with identical operating pressures. The cannister arrangement may be conveniently accessible on a low horizontal level. By providing a lid on the cannister the reject openings of the hydrocyclones may be easily inspected by removing the lid from the cannister.

BRIEF DESCRIPTION OF THE DRAWINGS

In the drawings which illustrate preferred embodiments of the invention.

DESCRIPTION FOR PREFERRED EMBODIMENTS

Figure 1:
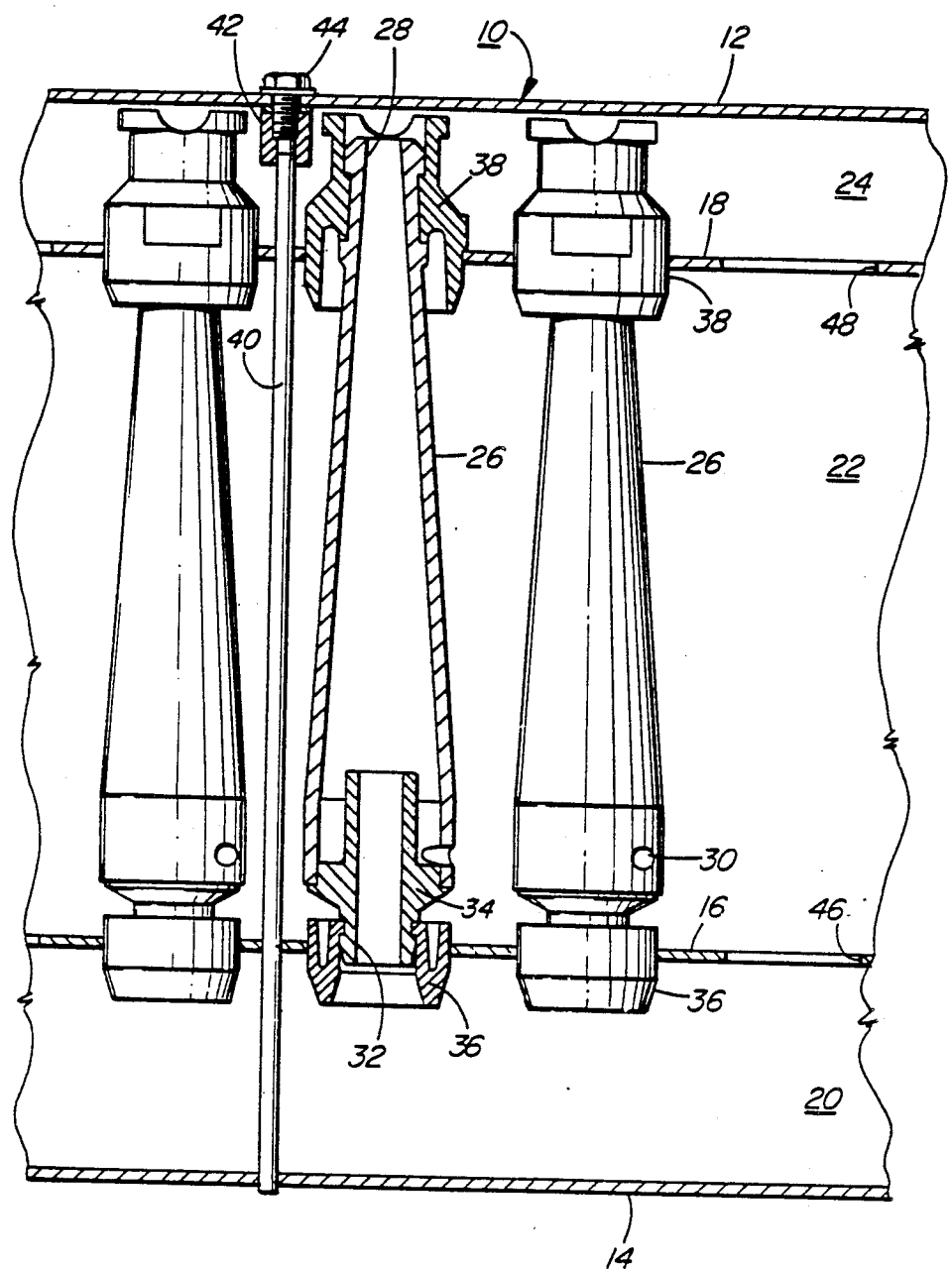
FIG. 1 is a fragmentary vertical cross section of a typical hydrocyclone cannister arrangement with flat partitions and illustrating hydrocyclones positioned therein with the novel sealing arrangements of the present invention cooperating with the apertures formed in the partition.

Referring now to FIG. 1 there is shown a hydrocyclone cannister arrangement 10 including a removable top lid 12, a flat bottom plate 14, flat interior partition walls 16 and 18 all located in spaced parallel relationship to one another and serving to define accept chamber 20, feed chamber 22, and reject chamber 24. A plurality of hydrocyclones 26 are shown having their respective reject outlets 28 in communication with reject chamber 24, their tangential inlets 30 in communication with the feed chamber 22 and their axially arranged accept outlets 32 in communication with accept chamber 20. The hydrocyclone, as shown, are of a generally conventional design and need not be described in detail. They may be made from any suitable material capable of resisting abrasion and having a long service life such as a suitable polyurethane elastomer. Typical hardness for such elastomer would be in the order of 65–70 Shore D. Each hydrocyclone body is provided with an accept-vortex finder part 34, the latter, among other things, defining the above noted accept outlets 32.

An accept end seal 36 in accordance with the present invention is locked on the accept-vortex finder part 34 and sealingly cooperates with the lower flat partition 16. Similarly, a reject end seal 38 is locked on the reject end portion of the cleaner body and cooperates with the flat upper partition 18 which is positioned between the reject and feed chambers. The bottom plate 14 separates the accept chamber 20 from the atmosphere while the removable top lid 16 separates the reject chamber 24 from the atmosphere. The top lid 12, upper and lower partitions 18 and 16 and the bottom plate 14 are effectively tied together to resist the pressure forces encountered during use by means of a multiplicity of suitably spaced apart linking rods 40 each equipped at its upper end with an internally threaded collar 42 for receiving threaded bolt 44 therein, threaded bolts 44 removably securing top lid 12 on the cannister.

The partition walls 16 and 18 referred to above are of course made sufficiently thick as to withstand the pressure differentials encountered during use. As noted previously, these wall thicknesses are usually in the order of 8 to about 13 mm. The apertures 46 and 48 in the partitions 16 and 18 respectively receiving the accept and reject end seals 36, 38 may be in a relatively raw or unfinished condition with the surfaces of the annular walls defining by such apertures being in a condition as might be expected after punching of the apertures without further finishing operations. As a result, these apertures 46 and 48 may be made with relatively crude tolerances and may be relatively poorly aligned with the holes being not perfectly round. As will be more fully described hereafter, the sealing arrangement according to the invention is capable of providing substantially leak proof seals when cooperating from these apertures of far from ideal finish and with pressure differentials up to about 400 kPa. Under start up conditions, at low pressures, the seal may not be perfect but as the pressure differentials increase, the sealing arrangement provided herein is more than sufficient for sealing requirements inside a multihydrocyclone cannister particularly when used for cleaning pulp slurry.

Figure 2:
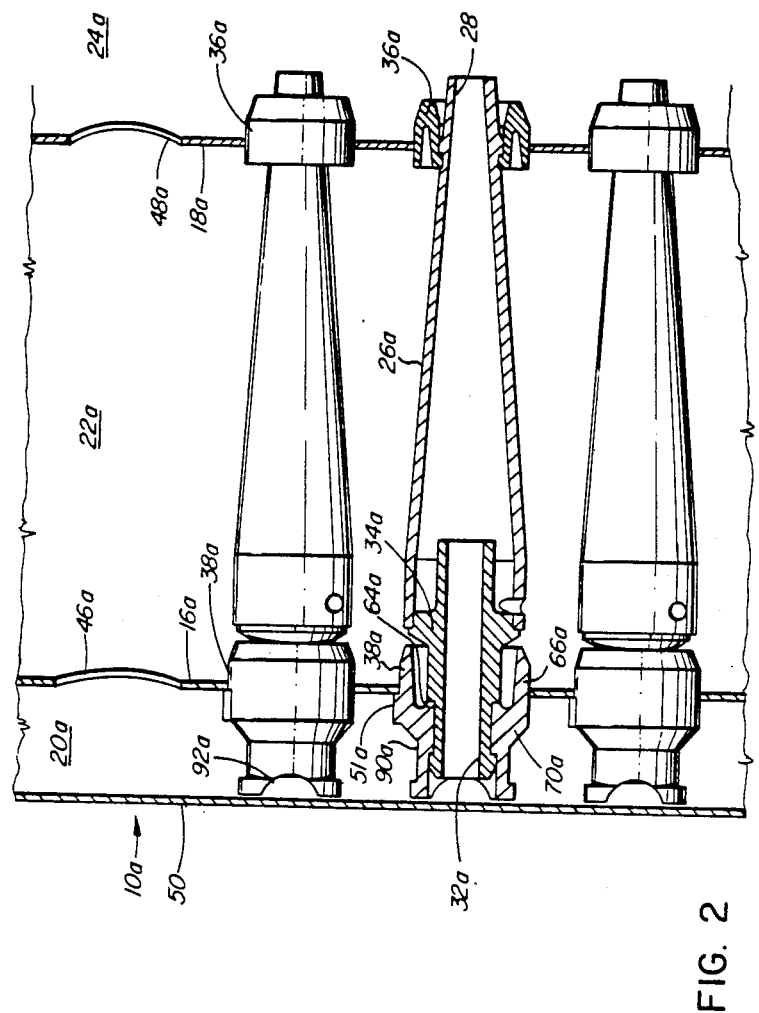
FIG. 2 is a fragmentary vertical cross section of a cannister arrangement employing cylindrical partition walls and illustrating hydrocyclones positioned in the apertures in such partitions with their sealing arrangements cooperating with the apertures.

Referring now to FIG. 2 there is shown a cannister arrangement having cylindrical thin walled partitions 16a and 18a between accept chamber 28, feed chamber 22a and reject chamber 24a.

The various hydrocyclones 26a are disposed in vertically spaced apart horizontal layers, each such layer comprising a plurality of hydrocyclones radially arranged around the common center line. Partitions 16a, 18a together with external cylindrical shell 50 are all arranged concentrically with respect to the common vertical center line. This overall design is well known in the art, having been patented in many countries a number of years ago.

As with the embodiment of FIG. 1 each hydrocyclone 26a includes an accept-vortex finder part 34a defining an accept outlet 32a communicating with accept chamber 20a. At the opposite end i.e. reject end of the hydrocyclone, the reject outlets 28a communicate with reject chamber 24a. The reject and accept end seals which cooperate with the thin cylindrical partition walls 16a and 18a are essentially the same as described previously in conjunction with FIG. 1 except that they have been switched end for end on the hydrocyclone with seal 38a, corresponding generally to seal 38 FIG. 1, being disposed on the vortex finder part 34a and the seal 36a on the reject end of the hydrocyclone corresponding generally to seal 36 of FIG. 1. Furthermore, as in the embodiment of FIG. 1, the apertures 46a and 48a formed in the cylindrical partitional wall of 16a, 18a are in the relatively raw or unfinished condition and may, for example, be not perfectly round, or not perfectly aligned with one another and so on. Moreover, it will be evident from an inspection of both FIGS. 1 and 2, that because of the fact that no "pushed out" or "pushed in" collars are formed at the location of the apertures, the aperture walls have a dimension, measured transverse to the partition at that location, equal to the thickness dimension of the partition. In the case of the embodiment of FIG. 2, since the partitions are only subjected to hoop stresses and axial loadings, thicknesses may be quite small e.g. in the order of 1.5 to 3.5 mm. depending upon the particular design.

Seals 38 and 38a shown in FIGS. 1 and 2 respectively are both provided with a small indexing lug 51, 51a respectively thereby to prevent the associated hydrocyclone from being inserted too far into the cannister chambers. Lug 51 for example butts against partition wall 18 while lug 51a in FIG. 2 butts against partition wall 16a. Movement of the hydrocyclone in the opposite direction is, in the embodiment of FIG. 1 prevented by the chamber top lid 12 and in the embodiment of FIG. 2 by the exterior cylindrical shell 50.

Figure 3:
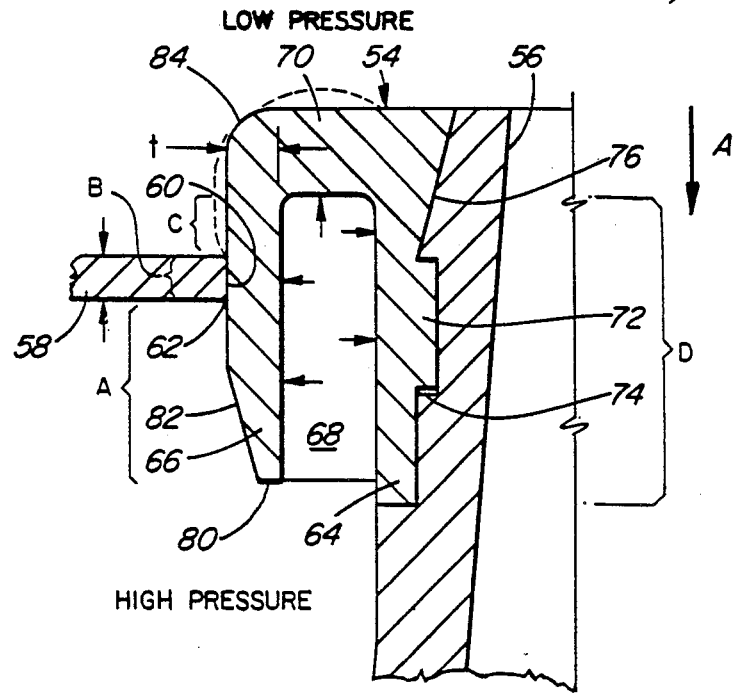
FIG. 3 is a simplified cross section of the novel sealing arrangement located on the reject end of a hydrocyclone and illustrating the manner in which the sealing is effected.

Referring now to FIG. 3, a somewhat simplified version of the seal is shown for purposes of illustration. The seals 36 and 38 of FIG. 1 and seals 36a and 38a of FIG. 2 employ the general features and principles of the seal shown in FIG. 3 although the sizes and the proportions may be varied somewhat. Accordingly with continued reference to FIG. 3, a seal 54 is illustrated as being mounted to the reject end of 56 of a hydrocyclone, the reject end of such hydrocyclone being disposed in a partition wall 58 in radially spaced relation to a wall 60 as defined by aperture 62 provided in such partition. The seal 54 is of annular cup-like form and is disposed in the annular space between the reject end 56 of the hydrocyclone and the wall 60 by defining the aperture 62. Seal 54 includes an inner annular lip and an outer seal lip 66 radially spaced from the inner lip 64 so as to define an annular space 68 between them. The inner and outer lips 64 and 66 are integrally connected together by a radially extending annular end wall 70. The radially inner surface of the inner lip 64 is provided with a shallow annular rib 72 which mates with a corresponding groove 74 provided on the reject end of the hydrocyclone to lock the seal securely in place. Furthermore, to assist in the installation of the seal 54 on the hydrocyclone, the reject end of the hydrocyclone has a conical exterior guide portion which cooperates with a corresponding conically shaped surface section 76 on the inner surface of inner lip 64.

The outer surface of the outer sealing lip 66 is of generally cylindrical shape except adjacent its free annular edge 80 where such lip is provided with a sloping or frustroconical wall section 82 whereby to assist in guiding the hydrocyclone including the attached seal 54 into position within the aperture 62 formed in the partition 58. It will be appreciated that with this particular arrangement insertion is accomplished by moving the hydrocyclone and the attached seal relative to partition 58 in the direction of arrow A. At the opposite end of seal 54 a convexly curved transition portion 84 is provided between end wall 70 and the exterior surface of outer seal 66.

The proportions of the dimensions of the various parts of the seal described above are not, generally speaking, critical and a common sense approach to the design in any particular situation, having regard to the examples illustrated in the drawings, would enable a designer of ordinary skill to put the invention into practice.

The seal is made from an elastomeric material such as a polyurethane elastomer, which elastomers may also be used in the manufacture of the hydrocyclone per se. Typical hardnesses for the seal elastomeric material in the case where polyurethane elastomer is used are in the order of 90–95 on the Shore A scale. A cleaner of the same material would usually have the hardness in the order of 65–70 on the Shore D scale. While in all the embodiments shown the seal is formed separately from the hydrocyclone and subsequently placed thereon and locked in position by means of the rib and groove locking means described above, it is quite possible for the seal and the hydrocyclone body to be molded together while still achieving satisfactory results. The seal itself is usually made of an elastomer which is softer than the elastomer of which the cleaner itself is made. The alternative noted above requires that these hardnesses be compensated since in the case of a unitary hydrocyclone-seal arrangement, the same material will be used throughout.

In practice the maximum outside diameter of the seal is slightly greater than the diameter of the aperture 62. Thus before any differential fluid pressure is applied to the seal there is preferably a slight interference fit between the seal and the partition wall which interference should not affect the ease with which the hydrocyclone and seal are inserted into aperture 62.

With continued reference to FIG. 3, the manner in which the seal responds to differential pressures will now be described. As noted above, the somewhat simplified seal design shown in FIG. 3 is shown as applied to the reject end 56 of a hydrocyclone, such reject end, and a portion of the seal projecting into the relatively low pressure reject chamber on the one side of partition 58 while on the other side of the partition 58, other portions of the seal together with the body of the hydrocyclone are exposed to the relatively high pressures existing within the feed chamber. As shown in FIG. 3 four separate zones A, B, C and D may be distinguished. The manner in which these zones of the seal respond to the pressures involved will now be set forth.

In zone "A" the seal material is evenly pressurized from all sides in accordance with Pascal's Law and the pressure on the inside of such seal 66 is equal to the pressure on the outside surface of same, the result being that there is no diametrical strain on the sealing lip, it being noted here that elastomers such as rubber and polyurethane are substantially incompressible. It will be noted that zone "A" extends from the free annular edge 80 of the seal to the partition 58.

In the intermediate zone "B" which comprises an annular zone substantially equal in width to the thickness of partition 58, the stresses inside the elastomeric material are basically equal to the relatively high pressure applied to the inner surface of the outer seal lip 66. This radially outwardly directed pressure force tends to cause excellent mating between the annular wall 60 defining aperture 62 and the outer surface of seal lip 66. even if the aperture wall is not smooth; as noted previously the aperture wall may be in a relative raw and unfinished condition such as produced by punching without subsequent finishing or machining and it may not be perfectly round. These good mating and sealing conditions hold true for almost any steel plate thickness which one would choose for partition 58 (whether the partition is flat as in the embodiment of FIG. 1 or cylindrical as in the embodiment of FIG. 2) unless, of course, the partition thickness is so minute that the aperture in effect has no wall and is as sharp as a knife in which event the outer seal wall 66 might be cut through under the influence of the pressure differential.

In zone "C" the seal behaves like a pressure vessel under hoop stresses and axial load. Some elastic deformation of the seal material will take place in the radial end wall 70 and in the adjacent portion of the outer seal lip 66 as indicated in somewhat exaggerated manner by the dashed lines. The thickness of (t) of the seal lip 66 is calculated to avoid exceeding the permissable elastic strain.

As we usually do not like to exceed 5% elongation the seal wall thickness "t" should be $$t \geq \frac{10 \times p \times d}{E}$$

For example for a 75 mm acting diameter hydrocyclone
d=100 mm, p max=180 kPa and E=36,000 kPa $$t \geq \frac{10 \times 180 \times 100}{36,000} = 5 \text{ mm, say } t = 6.25 \text{ mm}$$

In this case the increase in diameter will be $$\Delta d = \frac{pd^2}{2tE} = \frac{180 \times 100^2}{2 \times 6.25 \times 36,000} = 4 \text{ mm, meaning}$$

2 mm per side, which is well within allowable limits.

In zone "D" the seal material of the inner seal 64 is under the influence of the relatively high presures existing in the feed chamber and thus the seal at 64 is pressed radially inwardly against the hydrocyclone body thus providing for an excellent seal between them.

It will be appreciated that as the material in the hydrocyclone slightly expands due to moisture pick up and temperature increases, the seal structure provided above will allow for significant sliding travel in the axial direction within aperture 62 without any change in its performance. It is also significant to note that all of the four sealing zones A, B, C and D provide an important function as contrasted to the known prior art designs of "cup" type seals wherein one or more of the above sealing zones are missing.

Figure 4:
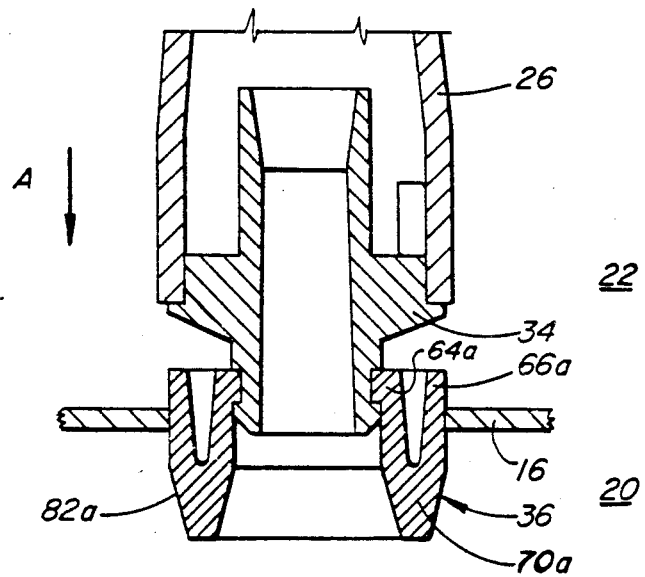
FIG. 4 is an enlarged cross section view showing the novel sealing arrangement as applied to the accept end of a hydrocyclone.

Referring now to FIG. 4, an enlarged view of a seal 36 according to the invention is shown at the accept end of hydrocyclone 26 and lockingly engaged with the accept-vortex finder part 34. It will be seen that this seal includes all of the characteristics of the seal described with reference to FIG. 3 in that it includes an outer seal lip 66a, an inner seal lip 64a, an end wall portion 70a with such seal 36 responding to the pressure differential between accept chamber 20 and feed chamber 22 in the same manner as described with reference to the embodiment of FIG. 3, all zones A, B, C and D being present. In view of all these similarities, a more detailed description of seal 36 is not considered necessary at this point. It might be noted however that the sloping frustro-conical portion 82a of shield 36 appears on the opposite end of the seal from that illustrated in FIG. 3 owing to the fact that while both embodiments are inserted into their respective apertures while moving the hydrocyclone in the same direction given by arrow A, the seal 36 is located at the opposite end of the hydrocyclone. Thus it will be readily apparent that the sloping guide portion 82 must be hence positioned at the opposite end of the seal.

Reverting now to the seals illustrated in FIGS. 1 and 2, it will be readily apparent that seal 38 and 38a both employ the essential characteristics of the simplified seal version illustrated in FIG. 3. With reference to FIG. 2 for example, seal 38a includes an outer seal lip 66a radially spaced outwardly from a relatively short inner seal lip 64a. These inner and outer lips are integrally connected together by a sloping end wall 70a. As with the simplified seal of FIG. 3, four distinct zones A, B, C and D may be distinguished when seal 38a is subjected to the differential pressures existing between feed chamber 22a and accept chamber 20a. One structural difference, which does not materially affect the basic performance of the seal, is that the end wall 78 is provided with a neck or extension 90a, the outer terminal end of which can come into contact with the outer shell or enclosure 50 of the hydrocyclone thus preventing further outward movement of the hydrocyclone body as a whole. In order to avoid shutting off or throttling of the accept flow, semi circular flow openings 92a are provided in such neck in diametric opposition to one another.

Figure 5:
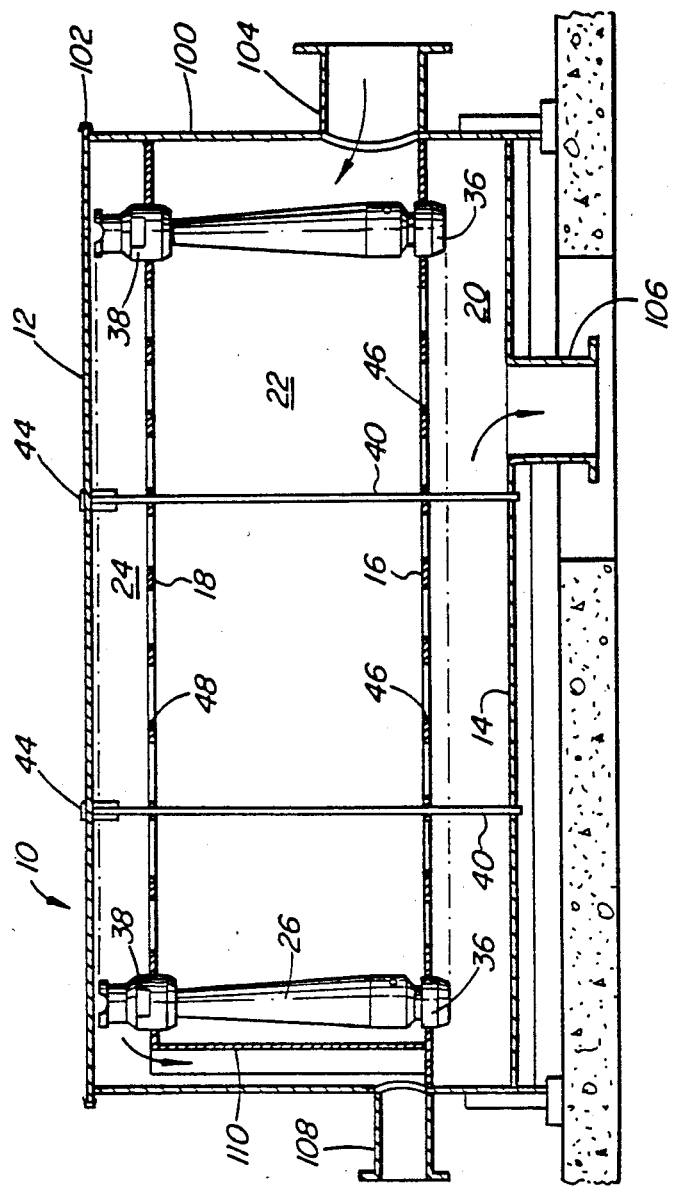
FIG. 5 is a vertical cross section of a novel cannister arrangement utilizing sealing arrangements according to the present invention.

FIG. 5 is a vertical cross section view of a complete cannister system incorporating the basic arrangement broadly described in connection with FIG. 1. Accordingly these same reference numerals have been used for all parts common to both FIG. 1 and FIG. 5. As described previously the cannister 10 includes a removable flat top lid 12 and a flat bottom plate 14 together with spaced parallel partitions 18 and 16 serving to separate feed chamber 22 from accept chamber 20 and reject chamber 24. Aligned sets of apertures 46 and 48 in partitions 16 and 18 respectively serve to receive therein seals 36 and 38 connected to the accept and reject ends respectively of the hydrocyclones 26 as described previously. A multiplicity of tie or reinforcing rods 40 serve to assist the partitions, the top lid and the bottom plate from distortion under the influence of the differential pressures thereon.

Although not apparent from FIG. 5, in plan view the cannister is of a circular outline and hence the outer shell of 100 thereof is of cylindrical shape, such shell being welded all around its lower portion to the flat bottom plate 14 and being provided at its upper edge with a suitable flange and the gasket arrangement 102 to receive and sealingly engage the top lid 12. A main feed connection 104 extends through shell 100 and communicates directly with feed chamber 22 to supply pulp slurry from the pulp pump to all of the hydrocyclones 26. A main accept connection 106 passing through flat bottom plate 14 communicates with accept chamber 20 and through it passes the accept flow from the hydrocyclones, such flow being subsequently delivered to the head box of the paper machine or to a stock storage shed. The main reject connection 108 also is connected through cylindrical outer shell 100 to the reject chamber 24. Through the reject connection 108 passes the contaminated slurry to further stages for additional pulp recovery or to a sewer, depending upon in which stage the cannister system 10 is located. Interior wall portion 110 serve to separate the reject flow from feed chamber 22 and provides communication between reject chamber 24 and the main reject outlet 108.

It will be seen from FIG. 5 that the hydrocyclone inlets, accept outlets and reject outlets are all located in respective vertically spaced horizontal planes so that all of the hydrocyclones in the cannister are subjected to the same operating conditions. It is also very easy to inspect the reject outlets of the hydrocyclones by removing the top lid 12 and the individual hydrocyclones can be very easily pulled out and replaced should that prove to be necessary.

The significance of providing for sealing cooperation with an aperture wall formed in a relatively thin plate in accordance with the present invention has substantial manufacturing and financial implications. Instead of machining or by some other process providing a cylindrical surface of substantial axial extent with a smooth surface finish and good circularity, as required by the prior art arrangement, the present invention permits one to use the simplest and cheapest technological processes for forming the apertures such as punching them out with relatively little attention being paid to the smoothness, concentricity, circularity or alignment of the holes thus obtained. The sealing arrangement of the invention also aleviates problems encountered in prior art arrangements involving swelling of ribs behind a collar and consequent difficulties when retracting the cleaner, deformation of sealing ribs, and loss of sealing gaskets within the cannister. Other advantages will readily be apparent to those skilled in this art.

The terms "processing apparatus" and "processing unit" as used herein are intended to cover not only equipment wherein some type of chemical or physical change is taking place in the fluid or fluids being "processed", but also cover equipment wherein simple processes are occurring such as fluid flow from one place to another as well as even simpler "processes" involving merely fluid containment under conditions such that the novel seal arrangement is interposed between zones of differing pressure.

I claim:

1. A processing apparatus including a partition for separating zones of relatively high and low pressure, at least one aperture in said partition, said aperture being defined by an annular wall having a transverse dimension measured in a direction normal to the partition at that location equal to the thickness of said partition; a processing unit having a portion thereof located in said aperture with an annular region defined between said unit and said wall of said aperture, an annular seal of resiliently deformable material located in said annular region providing a seal between said zones, said annular seal being of cup-shaped form and including an annular outer seal lip radially spaced from the processing unit, said outer seal lip being connected to the remainder of the annular seal via an end wall, the outer seal lip having inner and outer surfaces and a free annular edge remote from said end wall, said seal between said zones being created by said inner surface being exposed, in use, to the zone of higher pressure such that the outer surface of the outer seal lip sealingly engages, under the influence of the differential pressure acting thereon in use, said wall of said aperture, said annular seal being located relative to said wall of the aperture and said wall of said aperture being of such transverse dimension that said sealing engagement between said wall of said aperture and said outer surface of the outer seal lip occurs in an annular sealing region generally intermediate and spaced from both said end wall and said free annular edge of said seal lip.

2. The apparatus of claim 1 wherein said thickness dimension of the partition is sufficiently small in relation to the seal dimension that outer annular seal lip is exposed to at least three pressure zones namely:

(a) a first zone adjacent said free annular edge wherein such outer seal lip is exposed on both its inner surface and part of its outer surface to the zone of higher pressure;

(b) a second zone wherein such outer seal lip is engaged on its outer surface by said wall of said aperture along said annular sealing region and thus restrained against expanion under the influence of the pressure acting on its inner surface;

(c) a third zone wherein part of the outer surface of the outer seal lip together with the adjacent end wall are exposed to the zone of low pressure whereby the corresponding part of the seal lip is subject to hoop stresses and axial loads under the influence of the differential pressures acting thereon;

(d) said second zone being intermediate said first and third zones.

3. The apparatus of claim 1 or 2 wherein said wall of said aperture is in an unfinished condition.

4. The apparatus of claim 1 or 2 wherein said partition has a plurality of said apertures therein, each aperture having a respective processing unit and associated said annular seal located therein and sealingly engaged with the wall of the aperture.

5. The apparatus of claim 1 or 2 including a plurality of said partitions spaced apart and having sets of generally aligned said apertures therein, each set of apertures having an associated said processing unit disposed therein, and respective said annular seals located and sealingly engaged between said walls of said apertures and respective portions of said processing units.

6. The apparatus of claim 1 or 2 including a plurality of said partitions spaced apart and having sets of generally aligned said apertures therein, each set of apertures having an associated said processing unit disposed therein, and respective said annular seals located and sealingly engaged between said walls of said apertures and respective portions of said processing units, and wherein said apparatus comprises a multihydrocyclone arrangement, said processing units each comprising a hydrocyclone having a feed inlet, a reject outlet and an accept outlet each in fluid communication with a respective one of said zones.

7. The apparatus of claim 1 or 2 wherein said partition has a plurality of said apertures therein, each aperture having a respective processing unit and associated said annular seal located therein and sealingly engaged with the wall of the aperture, and each said annular seal having a sloping or frustro-conical surface portion adjacent the end of the annular seal to facilitate insertion thereof along with its associated said processing unit into a respective aperture.

8. The apparatus of claim 1 or 2 wherein the annular seal has, in the unstressed condition, an outside diameter slightly greater than the diameter of said aperture whereby to allow ready insertion of said unit with its associated annular seal into said aperture.

9. The apparatus of claim 1 or 2 wherein the annular seal has, in the unstressed condition, an outside diameter slightly greater than the diameter of said aperture whereby to allow ready insertion of said unit with its associated annular seal into said aperture, said annular seal also having a sloping or frustro-conical surface portion adjacent one of the opposing ends of the annular seal to facilitate the insertion thereof along with its associated said processing unit into a respective aperture.

10. The apparatus of claim 1 or 2 wherein said annular seal further includes an annular inner seal lip radially spaced from said outer seal lip and integrally connected thereto via said end wall, said inner seal lip having means on an inner surface thereof lockingly engaging with said processing unit.

11. The apparatus of claim 1 or 2 including a plurality of said partitions spaced apart and having sets of generally aligned said apertures therein, each set of apertures having an associated said processing unit disposed therein, and respective said annular seals located and sealingly engaged between said walls of said apertures and respective portions of said processing units, and wherein said apparatus comprises a multihydrocyclone arrangement, said processing units each comprising a hydrocyclone having a feed inlet, a reject outlet and an accept outlet each in fluid communication with a respective one of said zones, and said partitions being flat and parallel to one another.

12. The apparatus of claim 1 or 2 including a plurality of said partitions spaced apart and having sets of generally aligned said apertures therein, each set of apertures having an associated said processing unit disposed therein, and respective said annular seals located and sealingly engaged between said walls of said apertures and respective portions of said processing units, and wherein said apparatus comprises a multihydrocyclone arrangement, said processing units each comprising a hydrocyclone having a feed inlet, a reject outlet and an accept outlet each in fluid communication with a respective one of said zones, and said partitions being cylindrical and concentric with one another.

13. A cannister for a multihydrocyclone arrangement comprising a plurality of parallel partitions which, in the normal operating position of the cannister, are generally horizontally disposed and vertically spaced apart, said partitions including an upper partition and a lower partition both of which are perforated to provide a plurality of sets of generally vertically aligned apertures therein, each said aperture being defined by an annular wall having a transverse dimension measured in a direction normal to the partition at that location which is equal to the thickness of said partition, each said set of apertures being adapted to receive an associated hydrocyclone therein, said cannister including an outer side wall-defining shell, a bottom, and a top lid, with all said partitions located in the enclosure defined by the cannister, with said partitions forming parts of a reject chamber, a feed chamber and an accept chamber, said reject chamber being adjacent said top lid and extending above said upper perforated partition, said accept chamber extending below said lower perforated partition, and said feed chamber being located between said perforated partitions, said top lid being removable so that the reject ends of hydrocyclones, when installed in said sets of apertures, are exposed for inspection, and said sets of generally vertically aligned apertures being sized to allow the hydrocyclones to be axially inserted in or withdrawn from said perforated partitions via the top of the cannister when said top lid is removed.

14. The cannister multihydrocyclone of claim 13 wherein each said aperture is in a generally raw unfinished condition.

15. The cannister according to claim 13 or 14 wherein each said set of apertures has a respective hydrocyclone disposed therein, and anular seals between each such hydrocyclone and said annular walls of the associated said set of apertures to provide a sealing effect between said reject, feed and accept chambers, said annular seal being adapted to allow the individual hydrocyclones to be inserted into or withdrawn from their respective sets of apertures after said top lid has been removed.

16. The cannister of claim 13 wherein each of said partitions is essentially flat.

17. A cannister multihydrocyclone arrangement comprising a plurality of parallel partitions which in the normal operating position of the cannister are horizontally disposed and vertically spaced apart, said partitions including an upper partition and a lower partition both of which are perforated to provide a plurality of sets of generally vertically aligned apertures therein, each said aperture being defined by an annular wall having a transverse dimension measured in a direction normal to said partition which is equal to the thickness of said partition, each said set of apertures being adapted to receive an associated hydrocyclone therein, said cannister including an outer side wall-defining shell, a bottom, and a top lid, with all said partitions being located in the enclosure defined by the cannister with said partitions forming parts of a reject chamber, a feed chamber and an accept chamber, said reject chamber being adjacent said top lid and extending above said upper perforated partition, said accept chamber extending below said lower perforated partition and said feed chamber being located between said perforated partitions, said top lid being removable so that the reject ends of hydrocyclones, when installed in said sets of apertures, are exposed for inspection, and wherein each said set of apertures has a respective hydrocyclone disposed therein, and annular seals between each hydrocyclone and each of the annular walls of the associated said set of apertures to provide a sealing effect between said reject, feed and accept chambers, said annular seals together with said sets of apertures being adapted to allow the individual hydrocyclones to be inserted into or withdrawn from their respective sets of apertures after said top lid has been removed, each seal being of cup-shaped form and including an annular outer seal lip radially spaced from its associated hydrocyclone, said outer seal lip being connected to the remainder of the seal via an end wall, the outer seal lip having inner and outer surfaces and a free annular edge remote from said end wall, said inner surface being exposed, in use, to that chamber having the higher pressure such that the outer surface of the outer seal lip sealingly engages, under th influence of the differential pressure acting thereon in use, the associated said wall of said aperture, said seal being located relative to said wall of the aperture and said wall of the aperture being of such transverse dimension that said sealing engagement between said wall of the aperture and said outer surface of the outer seal lip occurs in an annular sealing region generally intermediate and spaced from both said end wall of the seal and said free annular edge of said seal lip.

18. The cannister multihydrocyclone of claim 17 wherein each of said partitions is essentially flat.

19. The cannister multihydrocyclone of claim 17 or 18 wherein each said aperture is in a generally raw unfinished condition.

* * * * *